US010852629B2

(12) United States Patent
Kurosaki

(10) Patent No.: US 10,852,629 B2
(45) Date of Patent: Dec. 1, 2020

(54) OPTICAL WHEEL, LIGHT SOURCE UNIT, AND PROJECTOR

(71) Applicant: CASIO COMPUTER CO., LTD., Tokyo (JP)

(72) Inventor: Hideyuki Kurosaki, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/566,679

(22) Filed: Sep. 10, 2019

(65) Prior Publication Data

US 2020/0103736 A1 Apr. 2, 2020

(30) Foreign Application Priority Data

Oct. 2, 2018 (JP) ................................ 2018-187117

(51) Int. Cl.
*F21S 10/00* (2006.01)
*G03B 21/20* (2006.01)
*G02B 26/00* (2006.01)
*F21V 9/45* (2018.01)
*F21K 9/64* (2016.01)
*F21V 9/32* (2018.01)

(52) U.S. Cl.
CPC ......... *G03B 21/204* (2013.01); *G02B 26/008* (2013.01); *F21K 9/64* (2016.08); *F21S 10/007* (2013.01); *F21V 9/32* (2018.02); *F21V 9/45* (2018.02)

(58) Field of Classification Search
CPC .......................... G03B 21/204; G03B 21/2053; G02B 26/008; F21S 10/007; F21V 9/45; F21V 9/32; F21K 9/64
See application file for complete search history.

(56) References Cited

U.S. PATENT DOCUMENTS

2017/0269462 A1* 9/2017 Maeda ................. G03B 21/204
2018/0299758 A1* 10/2018 Liao .................... G03B 21/2066

FOREIGN PATENT DOCUMENTS

| JP | 2012-047996 A | 3/2012 |
| JP | 2014-110109 A | 6/2014 |
| JP | 2014-191003 A | 10/2014 |
| JP | 2017-027685 A | 2/2017 |
| JP | 2017-116681 A | 6/2017 |
| JP | 2017-181603 A | 10/2017 |

* cited by examiner

*Primary Examiner* — Y M. Quach Lee
(74) *Attorney, Agent, or Firm* — Fitch, Even, Tabin & Flannery LLP

(57) ABSTRACT

An optical wheel according to the present invention includes a luminescent material light emitting area on which light in a first wavelength range is incident from one side to thereby emit luminescent light excited by the light in the first wavelength range from another side, and a controlling and diffusing optical area including a controlling section on which the light in the first wavelength range is incident from the one side and configured to cause a diffusing characteristic of the light in the first wavelength range to differ between in a radial direction and in a circumferential direction.

13 Claims, 7 Drawing Sheets

OPTICAL WHEEL, LIGHT SOURCE UNIT, AND PROJECTOR

CROSS-REFERENCE TO RELATED APPLICATION

This patent application is based upon and claims the benefit of priority under 35 USC 119 of Japanese Patent Application No. 2018-187117 filed on Oct. 2, 2018, the entire disclosure of which, including the description, claims, drawings, and abstract, is incorporated herein by reference.

BACKGROUND OF THE INVENTION

Field of the Invention

The present invention relates to an optical wheel, alight source unit including the optical wheel, and a projector including the light source unit.

Description of the Related Art

In these days, projectors are used in which light emitted from a light source is collected onto a digital micromirror device (DMD) or a liquid crystal panel so as to display a color image onto a screen.

Japanese Patent Laid-Open No. 2017-181603 discloses a projector including an excitation light source configured to emit excitation light from a semiconductor light emitting device and functioning as a blue light source for emitting light having a wavelength in the blue wavelength range and an optical wheel (a luminescent material wheel) configured to be driven to rotate by a motor and on to which excitation light is shined. A red luminescent material light emitting area having a red luminescent material layer, a green luminescent material light emitting area having a green luminescent material layer, and a reflection area configured to reflect excitation light are formed on the optical wheel.

In the case where a laser diode is used as a semiconductor light emitting device, light having an elliptic cross section is emitted. Then, since an image is formed by luminescent light having a circular cross section due to being diffuse light and light having an elliptic cross section that is emitted from the laser diode, an illuminance error or a chromatic error may be generated in projected light.

SUMMARY OF THE INVENTION

The present invention has been made in view of the situations described above, and an object of the present invention is to provide an optical wheel that can reduce an illuminance error or a chromatic error that would be generated in projected light, a light source unit including the optical wheel, and a projector including the light source unit.

According to an aspect of the present invention, there is provided an optical wheel including a luminescent material light emitting area on which light in a first wavelength range is incident from one side to thereby emit luminescent light excited by the light in the first wavelength range from the other side and a controlling and diffusing optical area including a controlling section on which the light in the first wavelength range is incident from the one side and configured to cause a diffusing characteristic of the light in the first wavelength range to differ between in a radial direction and in a circumferential direction.

According to another aspect of the present invention, there is provided a light source unit including the optical wheel described above, a motor configured to drive to rotate the optical wheel, a driving control unit for the motor, and a first semiconductor light emitting device configured to emit the light in the first wavelength range.

According to a further aspect of the present invention, there is provided a projector including the light source unit described above, a display device on to which light source light from the light source unit is shined to form image light, a projection optical system configured to project the image light emitted from the display device on to a screen, the display device, and a control unit configured to control the display device and the light source unit.

DETAILED DESCRIPTION OF THE PREFERRED EMBODIMENTS

Figure 1:
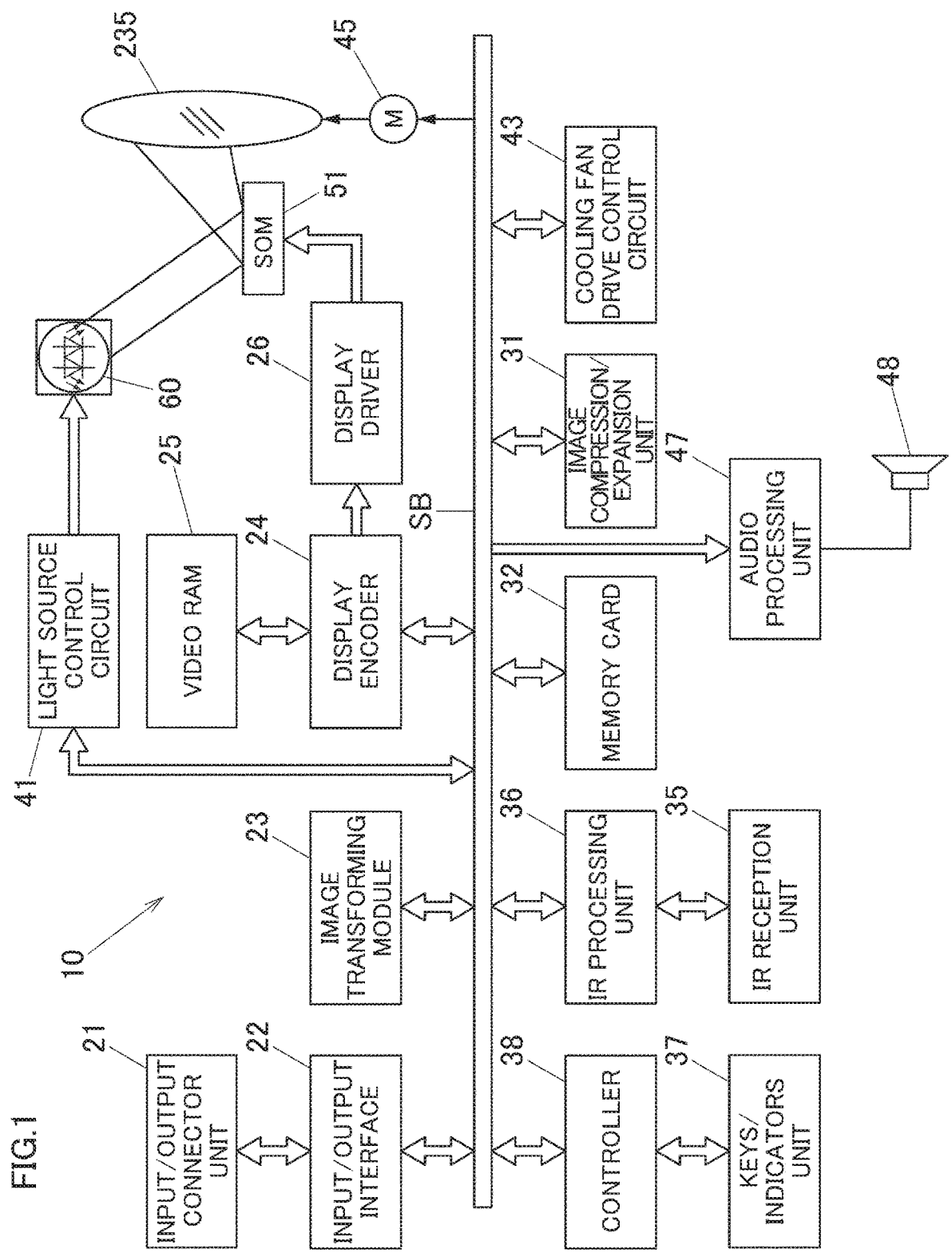
FIG. 1 is a block diagram illustrating functional circuit blocks of a projector according to an embodiment of the present invention.

Hereinafter, an embodiment of the present invention will be described based on drawings. FIG. 1 is a block diagram illustrating functional circuit blocks of a projector control unit of a projector 10. The projector control unit includes a CPU including an image transforming module 23 and a controller 38, a front-end unit including an input/output interface 22, and a formatter unit including a display encoder 24 and a display driver 26.

The controller 38 governs the control of operations of individual circuitries inside the projector 10 and includes CPU, ROM storing fixedly operation programs such as various settings, RAM that is used as a work memory, and the like.

Then, image signals of various standards which are inputted from an input/output connector unit 21 are sent, via the input/output interface 22 and a system bus (SB), to the image transforming module 23, where the image signals are transformed so as to be unified into an image signal of a predetermined format which is suitable for display. Thereafter, the unified image signal to the display encoder 24.

The display encoder 24 deploys the inputted image signal on a video RAM 25 for storage in it and generates a video signal from the contents stored in the video RAM 25, outputting the video signal so generated to the display driver 26.

The display driver 26 drives a display device 51, which is a spatial optical modulator (SOM), at an appropriate frame rate according to the image signal outputted from the display encoder 24.

Then, in the projector 10, a pencil of light emitted from a light source unit 60 is shined on to the display device 51 by way of a light guiding optical system to thereby form an optical image by light reflected from the display device 51, and the image so formed is then projected onto a screen, not illustrated, for display by way of a projection optical system 220. A movable lens group 235 of the projection optical system is driven by a lens motor 45 for zooming and focusing.

An image compression/expansion unit 31 performs a recording process in which a luminance signal and a color difference signal of an image signal are data compressed through processing of Adaptive Discrete Cosine Transform (ADCT) and Huffman coding, and the compressed data is sequentially written on a memory card 32, which constitutes a detachable recording medium.

Further, with the projector 10 set in a reproducing mode, the image compression/expansion unit 31 reads out the image data recorded in the memory card 32 and expands the individual image data that makes up a series of dynamic images frame by frame. Then, the image compression/expansion unit 31 outputs the image data to the display encoder 24 by way of the image transforming module 23 and enables the display of dynamic images based on the image data stored in the memory card 32.

Operation signals from a keys/indicators unit 37 including main keys and indicators which are provided on an upper panel of a casing of the projector 10 are sent out directly to the controller 38. Key operation signals from a remote controller are received by an IR reception unit 35 and are then demodulated into a code signal at an Ir processing unit 36 for output to the controller 38.

The controller 38 is connected with an audio processing unit 47 by way of a system bus (SB). This audio processing unit 47 includes a circuitry for a sound source such as a PCM sound source. With the projector 10 set in a projection mode and the reproducing mode, the audio processing unit 47 converts audio data into analog signals and drives a speaker 48 to output loudly sound or voice based on the audio data.

The controller 38 controls a light source control circuit 41, which functions as a light source control unit. The light source control circuit 41 controls individually emission of light from a red light source device, a green light source device, and a red light source device of the light source unit 60 so that light beams in predetermined wavelength ranges required for forming an image are emitted from the light source unit 60.

Further, the controller 38 causes a cooling fan drive control circuit 43 to detect temperatures with a plurality of temperature sensors which are provided in the light source unit 60 so as to control revolution speeds of cooling fans based on the results of the temperature detections. Additionally, the controller 38 also causes the cooling fan drive control circuit 43 to keep the cooling fans revolving by use of a timer or the like even after a power supply to a main body of the projector 10 is switched off. Alternatively, the controller 38 causes the cooling fan drive control circuit 43 to cut off the power supply to the main body of the projector 10 depending upon the results of the temperature detections by the temperature sensors.

Figure 2:
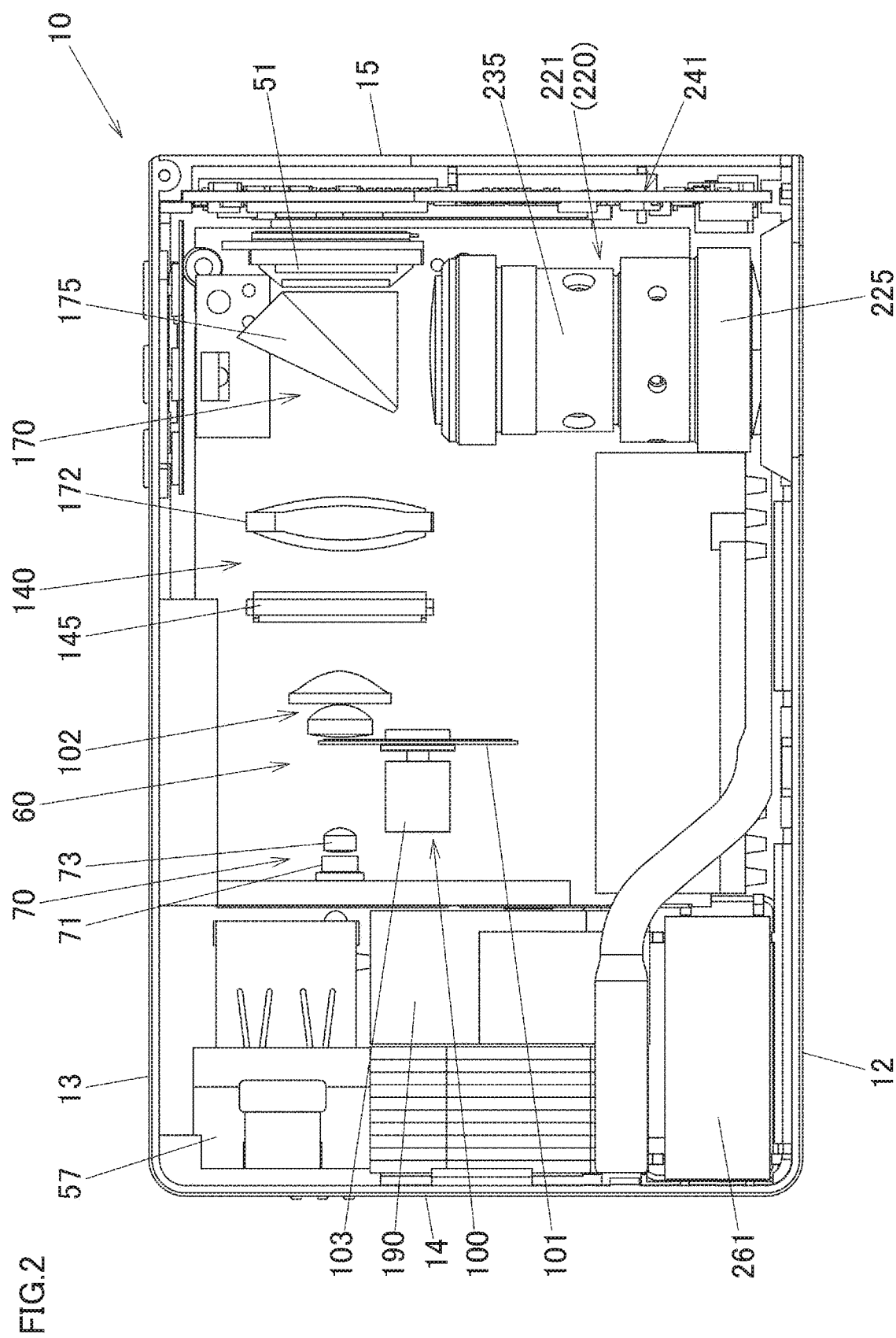
FIG. 2 is a schematic plan view illustrating an internal structure of the projector according to the embodiment of the present invention.

Next, an internal structure of the projector 10 will be described. FIG. 2 is a schematic plan view illustrating the internal structure of the projector 10. Here, a casing of the projector 10 is formed substantially into a box-like configuration and includes an upper surface and a lower surface, a front panel 12, a rear panel 13, a right panel 14, and a left panel 15. It should be noted that in the following description, when left and right are referred to in relation to the projector 10, they denote, respectively, left and right directions with respect to a projecting direction of the projector 10. When front and rear are referred to in relation to the projector 10, they denote, respectively, front and rear directions with respect to a direction from the projector 10 towards a screen and a traveling direction of a pencil of light from the projector 10.

The projector 10 includes a control circuit board 241 near the left panel 15. This control circuit board 241 includes a power supply circuit block, a light source control block, and the like. The projector 10 also includes the light source unit 60 at a substantially central portion of the casing of the projector 10. Further, in the projector 10, a light source-side optical system 170 and a projection optical system 220 are disposed between the light source unit 60 and a left panel 15.

A power supply connector 57, a heat sink 190 for cooling a blue laser diode 71 of an excitation light shining device 70, which will be described later, and a cooling fan 261 for blowing cooling air against the heat sink 190 are provided between the light source unit 60 and the right panel 14.

The light source unit 60 includes the excitation light shining device 70, which constitutes not only a light source of light having a wavelength in the blue wavelength range or, simply, light in the blue wavelength range (light in a first wavelength range) but also a light source of excitation light and an optical wheel device 100. Light having a wavelength in the red wavelength range or, simply, light in the red wavelength range, light having a wavelength range in the green wavelength range or, simply, light in the green wavelength range, and light in the blue wavelength range are emitted from the optical wheel device 100. Light in the red wavelength range, light in the green wavelength range, and light in the blue wavelength range that are emitted from the optical wheel device 100 are guided by a light guiding optical system 140.

The excitation light shining device 70 includes one blue laser diode 71, which is a first semiconductor light emitting device configured to emit light in the blue wavelength range, and one collimator lens 73 configured to convert light emitted from the blue laser diode 71 into parallel light so as to enhance the directivity thereof. The excitation light shining device 70 is disposed on a side of the heat sink 190 that faces the left panel and relatively closer to the rear panel 13 and is disposed in such a manner as to emit light in the direction of the left panel 15.

The optical wheel device 100 includes an optical wheel 101, which is disposed on an optical path of excitation light emitted from the excitation light shining device 70 in such a manner as to be at right angles thereto, a collective lens group 102 configured to collect light from the optical wheel 101, a motor 103 for driving to rotate the optical wheel 101, and a driving control unit (not shown) for controlling the motor 103. Here, the driving control unit is controlled by the light source control circuit 41 (refer to FIG. 1). The optical wheel device 100 will be described in detail later.

The light guiding optical system 140 includes a microlens array 145 on which light emitted from the collective lens group 102 of the optical wheel device 100 is incident. The microlens array 145 includes a plurality of microlenses. Light beams in the red, green, and blue wavelength ranges each have a substantially circular cross-sectional shape are shined on to the plurality of microlenses of the microlens array 145. Light beams that pass through the individual microlenses of the microlens array 145 are superposed on the display device 51, whereby intensities of the light beams in the red, green, and blue wavelength ranges are distributed uniformly. The light guiding optical system 140 is designed to distribute uniformly the intensities of light beams in the red, green, and blue wavelength ranges on the display device 51. A biconvex lens having a laterally elongated rectangular shape in a plan view is used for the microlenses of the microlens array 45, and such biconvex lenses are arranged into a grid-like configuration. The microlenses should preferably have a laterally elongated rectangular shape that matches the shape of the display device 51.

The light source-side optical system 170 includes a collective lens 172 and an RTIR prism 175. The collective lens 172 is disposed on a side of the microlens array 145 that faces the left panel 15 and collects pseudo-rectangular light source light that is divided when it passes through the microlens array 145 in such a manner as to be superposed on each other in an effective size of the display device 51 to thereby distribute the intensity of the light source light uniformly. The pencil of light collected by the collective lens 172 is shined on to the display element 51 via the RTIR prism 175. Then, an axis of on light reflected on the display device 51 is caused to coincide with an optical axis of the projection optical system 220 by the RTIR prism 175, and the on light is then emitted towards a lens barrel 221.

The projection optical system 220 includes the lens barrel 221. The lens barrel 221 is made up of the movable lens group 235 and a fixed lens group 225. The movable lens group 235 can be moved by the lens motor. Then, the movable lens group 235 and the fixed lens group 225 are incorporated in the lens barrel 221. Thus, the lens barrel 221 including the movable lens group 235 is configured as a variable-focus lens, whereby zooming and focusing can be performed.

With the projector 10 configured in the way described above, when the optical wheel 101 is rotated, and light is emitted from the excitation light shining device 70 at predetermined timings, light beams in the red, green, and blue wavelength ranges are incident on the display device 51 by way of the light guiding optical system 140 and the light source-side optical system 170, whereby the light beams in the red, green, and blue wavelength ranges are displayed in a time-sharing fashion by DMD, which is the display device 51 of the projector 10, thereby making it possible to project a color image on to a screen.

Next, the optical wheel 101 of the optical wheel device 100 will be described in detail based on FIGS. 3A, 3B, 4A, and 4B. Firstly, as illustrated in FIG. 4A, the optical wheel 101 includes two wheels (a first wheel 110, a second wheel 120), and the first wheel 110 and the second wheel 120 are disposed in such a manner as to be superposed on each other. In the optical wheel 101, excitation light is incident from one side 100a which constitutes a side where the excitation light shining device 70 is provided, and light beams in the red, green, and blue wavelength rages are emitted from the other side 100b where the collective lens group 102 is provided.

Figure 3A:
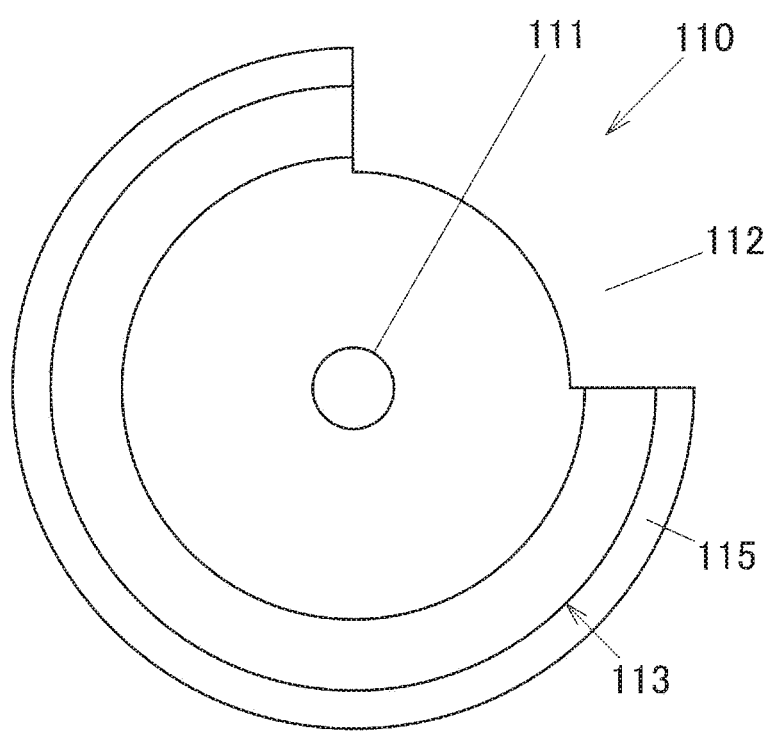
FIG. 3A is a schematic front view illustrating a first wheel of an optical wheel device according to the embodiment of the present invention.
Figure 4A:
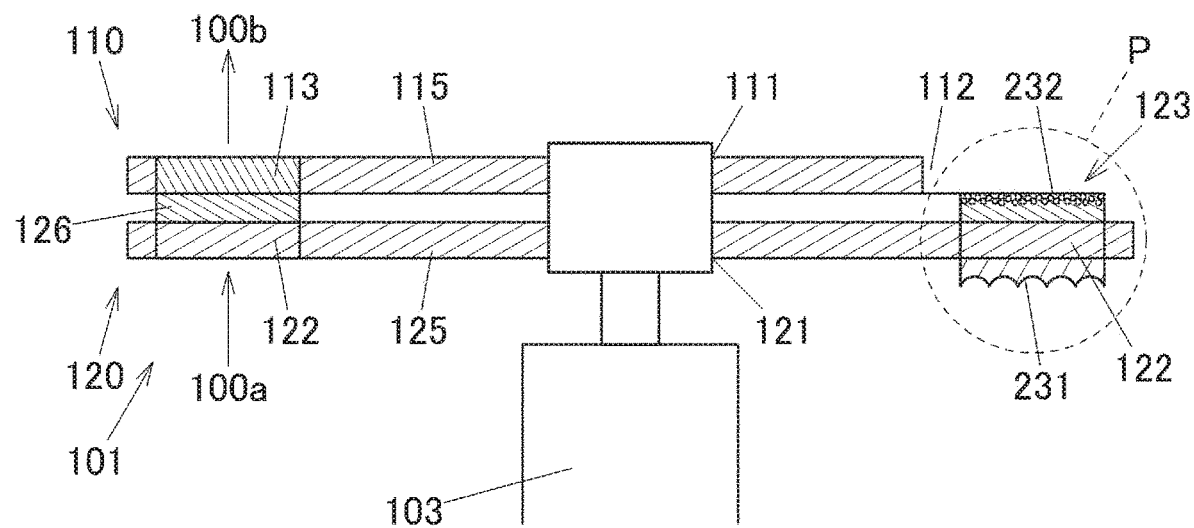
FIG. 4A is a schematic diagram illustrating an optical wheel of the optical wheel device according to the embodiment of the present invention, that is, a cross-sectional view of an optical wheel 101 into which the first wheel and the second wheel are combined corresponding to a section taken along a line Iva-Iva in FIG. 3B.

The first wheel 110 provided on the other side includes a first wheel base material 115 as illustrated in FIG. 3A. The first wheel base material 115 has a substantially circular disc-like shape, and an attaching hole 111 where the first wheel base material 115 or the first wheel 110 is attached to the motor 103 is formed in a center thereof. The first wheel base material 115 is formed of glass or the like.

The first wheel 110 includes a cut-out section 112 that is formed by cutting part of an outer circumferential portion of the first wheel base material 115 into an arc-like shape that extends over a range of substantially 90 degrees. The first wheel 110 includes a dichroic area 113 that is formed into an arc-like shape on the first wheel base material 115 in such a manner as to extend over a range of substantially 270 degrees. The dichroic area 113 is made up of a dichroic mirror that is formed into an arc-like shape. The dichroic area 113 reflects light in the blue wavelength range and transmits light in the red wavelength range and light in the green wavelength range.

In place of the dichroic area 113, which is made up of the dichroic mirror, of the first wheel 110, a dichroic area 113 may be formed by applying a dichroic coating layer configured to reflect light in the blue wavelength range while transmitting light in the red wavelength range and light in the green wavelength range to an upper surface of a luminescent material light emitting area 126.

Figure 3B:
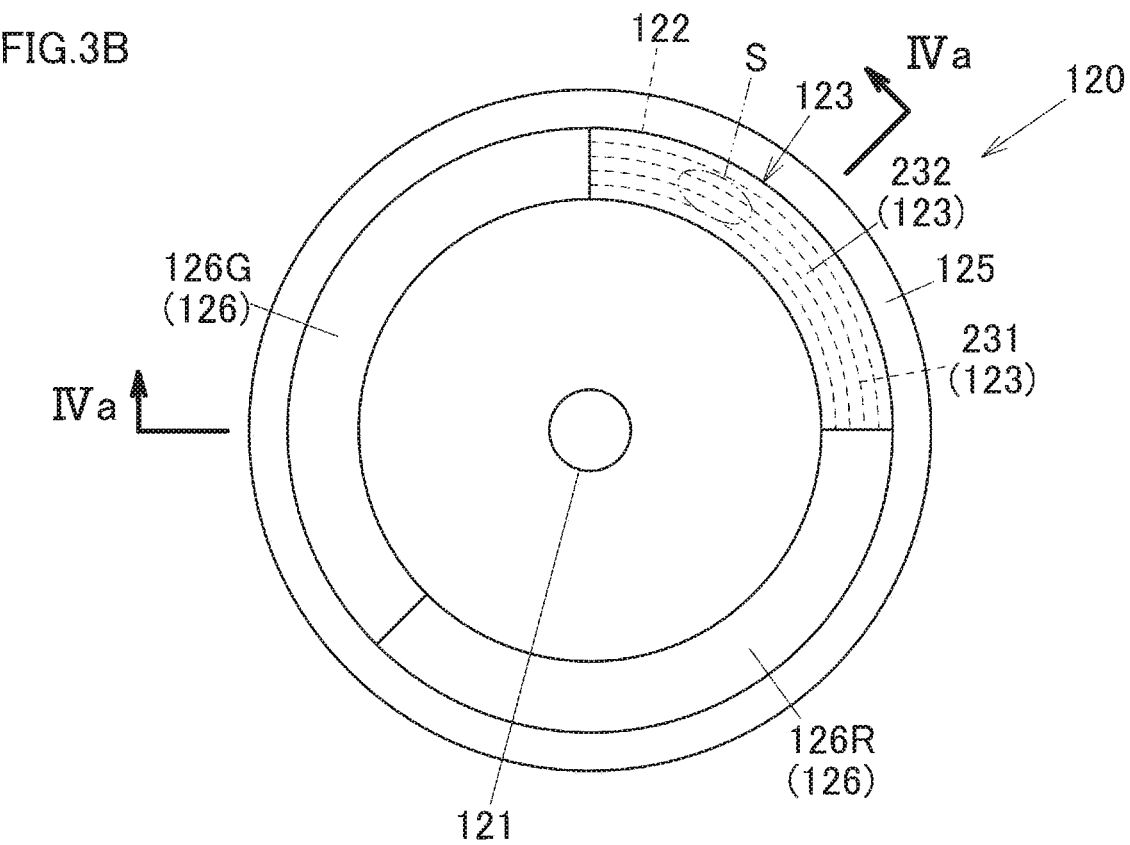
FIG. 3B is a schematic front view illustrating a second wheel of the optical wheel device according to the embodiment of the present invention.

The second wheel 120 provided on the one side 100a includes a second wheel base material 125 as illustrated in FIG. 3B and FIG. 4A. The second wheel base material 125 has a substantially circular disc-like shape, and an attaching hole 121 where the second wheel base material 125 or the second wheel 120 is attached to the motor 103 is formed in a center thereof. The second wheel base material 125 is formed of glass or the like. The second wheel 120 includes a transmitting member 122 that is formed into an annular shape on the second wheel base material 125. The transmitting member 122 is also formed of glass or the like and can transmit light.

The second wheel 120 includes a luminescent material light emitting area 126 and a controlling and diffusing optical area 123 that are formed in such a manner as to correspond to the transmitting member 122 on the second wheel base material 125, and the luminescent material light emitting area 126 and the controlling and diffusing optical area 123 are each formed into an arc-like shape and are disposed end to end in a circumferential direction. The luminescent material light emitting area 126 is formed on a surface of the other side 100b of the second wheel base material 125 in such a manner as to extend over a range of about 270 degrees. The luminescent material light emitting area 126 includes two areas each extending over a range of about 135 degrees (a first luminescent material light emitting area 126R and a second luminescent material light emitting area 126G).

The controlling and diffusing optical area 123 is formed through the second wheel base material 125 from a surface on the one side 100a to a surface on the other side thereof in such a manner as to extend over a range of about 90 degrees. The second wheel 120 is disposed in a circumferential direction (a rotational direction) relative to the first wheel 110 in such a manner that the luminescent material light emitting area 126 corresponds to the dichroic area 113 and the controlling and diffusing optical area 123 corresponds to the cut-out section 112.

The luminescent material light emitting area 126 is made up of an arc-shaped transmitting luminescent material. The transmitting luminescent material is made up, for example, of a sintered material of a power mixture containing glass powder and luminescent material powder. When excitation light is incident on the luminescent material light emitting area 126 from one side, a luminescent material is excited to emit luminescent light. Here, a transmitting luminescent material of the first luminescent material light emitting area 126R contains a luminescent material that emits luminescent light in the red wavelength range (first luminescent light). A transmitting luminescent material of the second luminescent material light emitting area 126G contains a luminescent material that emits luminescent light in the green wavelength range (second luminescent light) whose wavelength range differs from that of the first luminescent light.

Consequently, when a shining spot of light in the blue wavelength range, that is, excitation light from the blue laser diode 71 of the excitation light shining device 70 is positioned on the first luminescent material light emitting area 126R as a result of rotation of the optical wheel 101, excitation light that is incident from the one side 100a passes through the transmitting member 122 of the second wheel 120 to be incident on the first luminescent material light emitting area 126R, whereby luminescent light in the red wavelength range is emitted from the first luminescent material light emitting area 126R. Part of the luminescent light that is emitted in every direction is emitted to the other side 100b, passes through the dichroic area 113 of the first wheel 110, and is collected by the collective lens group 102.

As this occurs, excitation light that is incident from the one side 100a to pass through the first luminescent material light emitting area 126R without exciting the luminescent material is reflected by the dichroic area 113 and can excite luminescent material in the first luminescent material light emitting area 126R that has not yet been excited. In addition, the efficiency with which luminescent light in the red wavelength range is emitted can be enhanced by providing a dichroic coat layer configured to reflect light in the red wavelength range but transmit light in the blue wavelength range on the one side 100a (for example, on a surface of the transmitting member 122) of the first luminescent material light emitting area 126R (also, the second luminescent material light emitting area 126G). Further, a reflecting member can also be provided on an inside diameter side and an outside diameter side of the luminescent material light emitting area 126. In this way, light in the red wavelength range is emitted from the optical wheel device 100. Similarly, when the shining spot of excitation light is positioned on the second luminescent material light emitting area 126G, light in the green wavelength range is emitted from the optical wheel device 100.

Figure 4B:
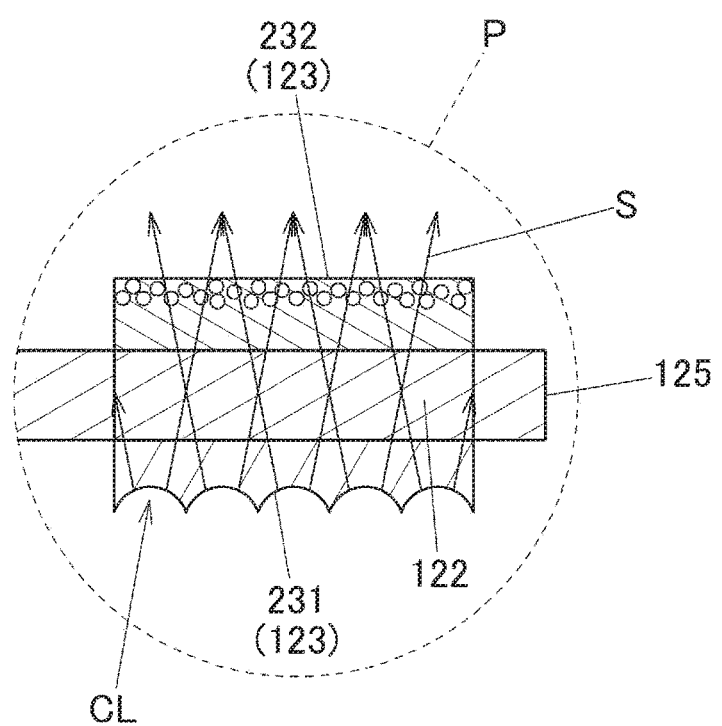
FIG. 4B is an enlarged view of a portion P in FIG. 4A.

As illustrated in FIGS. 3B, 4A, and 4B, the controlling and diffusing optical area 123 includes a controlling section 231 that is provided on a side of the transmitting member 122 of the second wheel 120 that faces the one side 100a and a diffusing section 232 that is provided on a side of the transmitting member 122 that faces the other side 100b. When light in the blue wavelength range emitted from the excitation light shining device 70 is incident on the controlling section 231 from the one side 100a, the controlling section 231 controls a diffusing or spreading angle so that a diffusing characteristic of the light in the blue wavelength range differs between in a radial direction and in a circumferential direction.

The controlling section 231 is formed into an arc-like shape that extends along the transmitting member 122. The controlling section 231 is made up of an array of a plurality of cylindrical lenses of a concavely recessed arc-like cross section that are identical in relation to a radial cross-sectional shape. In other words, the cylindrical lens array is formed by disposing the plurality of longitudinally arc-shaped cylindrical lenses of the recessed cross section. A side of the controlling section 231 that faces the other side 100b is formed into a flat surface so as to be joined to the transmitting member 122.

The diffusing section 232 constitutes a diffusing plate on which a diffusing layer is formed on a side facing the other side 100b by providing minute irregularities through sandblasting or the like. The diffusing section 232 emits light in the blue wavelength range that passes through the controlling section 231 to the other side 100b while spreading it.

When the shining spot of light in the blue wavelength range, which is excitation light from the blue laser diode 71 of the excitation light shining device 70, is positioned on the controlling and diffusing optical area 123 as a result of rotation of the optical wheel 101, light in the blue wavelength range, which is laser light, is incident on the controlling and diffusing optical area 123 from the one side 100a. At this time, light of an elliptic cross section emitted from the blue laser diode 71 is shined on to the one side 100a of the controlling section 231 like laser light S illustrated schematically in FIG. 3B in such a manner that a major axis direction of the laser light S coincides with a longitudinal direction of the cylindrical lens (a circumferential direction of the arc-shaped cylindrical lens) while a minor axis direction of the laser light S coincides with a transverse direction of the cylindrical lens (a radial direction of the arc-shaped cylindrical lens). Then, as illustrated in FIG. 4B, a spreading angle in the minor axis direction of the laser light S is expanded by a cylindrical lens CL, whereby the cross-sectional shape of the laser light S is shaped into a substantially circular shape. The laser light S that passes through the controlling section 231 passes through the transmitting member 122 to be emitted, while being diffused, to the other side 100b by way of the diffusing section 232 and the cut-out section 112.

In this way, light of a substantially elliptic cross section emitted from the blue laser diode 71 is incident on the optical wheel device 100 and is then emitted therefrom in the form of diffuse light in the blue wavelength of a substantially circular cross section. Consequently, the light in the blue wavelength range emitted from the optical wheel device 100 can be light of a circular cross section whose size is substantially the same as that of luminescent light emitted from the luminescent material light emitting area 126 of the optical wheel device 100, whereby the illuminance error and chromatic error of projection light can be reduced. Then, the luminescent light and the laser light can be substantially the same in size and shape, whereby the microlens array 145 does not have to be specific to either of the luminescent light and the laser light, and the intensities of the luminescent light and the laser light can be distributed uniformly by the same microlens array 145 with good efficiency.

First Modified Example

Figure 5:
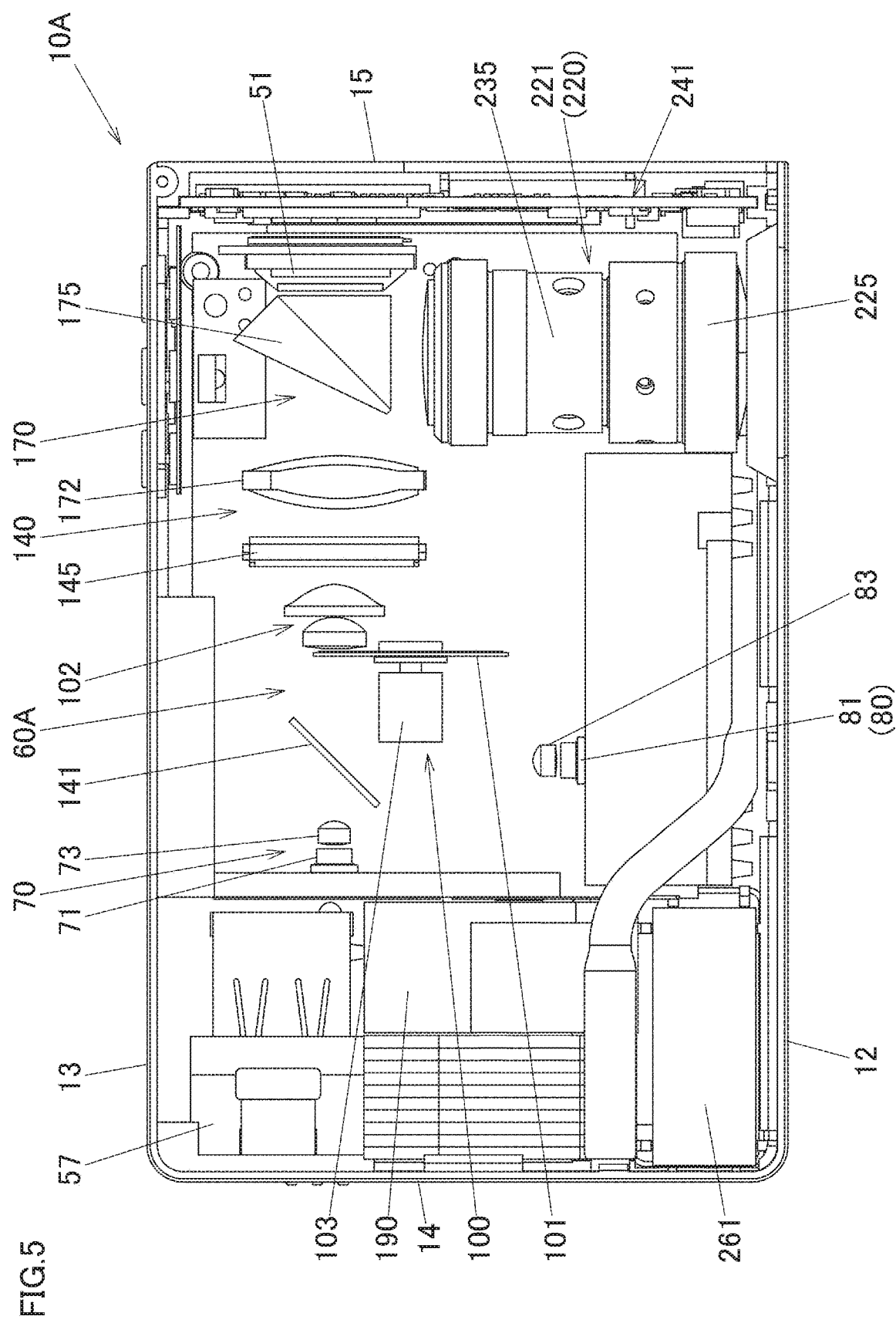
FIG. 5 is a schematic plan view illustrating an internal structure of a projector according to a first modified example of the embodiment of the present invention.

Next, a first modified example of the embodiment will be described based on FIG. 5. In this first modified example, the first luminescent material light emitting area 126R of the luminescent material light emitting area 126 on the second wheel 120 of the optical wheel 101 is eliminated, and a red light source device 80 is provided instead. The red light source device 80 includes a red laser diode 81, which is a second semiconductor light emitting device configured to emit laser light in the red wavelength range (light in a second wavelength range), and a collimator lens 83. The red laser diode 81 is disposed in such a manner that an optical axis of the red laser diode 81 intersects an optical axis of a blue laser diode 71 at right angles. A dichroic mirror 141 is provided in a position where the optical axis of the red laser diodes 81 intersects the optical axis of the blue laser diode 71 at right angles. The dichroic mirror 141 transmits light in the blue wavelength range and reflects light in the red wavelength range.

In a light source unit 60A of a projector 10A formed as described above, excitation light, which is light in the blue wavelength range, emitted from an excitation light shining device 70 passes through the dichroic mirror 141 and is incident on a luminescent material light emitting area 126 (a second luminescent material light emitting area 126G containing a green luminescent material) of the optical wheel 101 on which a shining spot is positioned from one side 100a. Consequently, when the shining spot of excitation light, which is light in the blue wavelength range, emitted from the excitation light shining device 70 is positioned on a controlling and diffusing optical area 123 of the optical wheel 101, light in the blue wavelength range passes through the dichroic mirror 141 and is then emitted from the other side 100b byway of the controlling and diffusing optical area 123 in the form of diffuse light whose elliptic cross section is controlled into a circular shape. Similarly, light in the red wavelength range emitted from the red light source device 80 is emitted when the shining spot is positioned on the controlling and diffusing optical area 123 of the optical wheel 101, is reflected by the dichroic mirror 141 to be incident on the controlling and diffusing optical area 123 from the one side 100a, and is emitted from the other side 100b by way of the controlling and diffusing optical area 123 in the form of a diffuse light whose elliptic cross section is controlled into a circular shape.

Second Modified Example

Figure 6A:
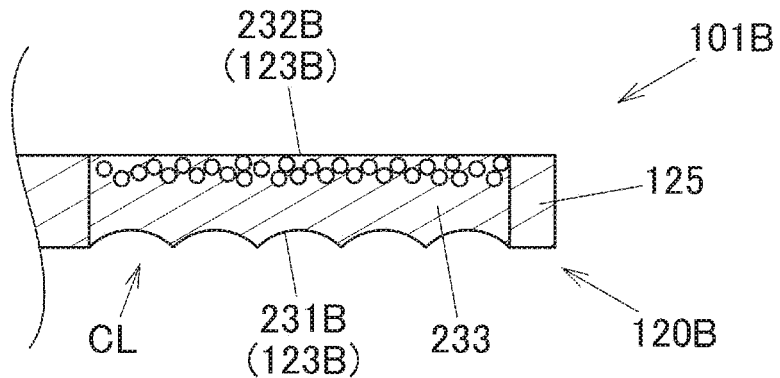
FIG. 6A is a schematic enlarged cross-sectional view of a main portion, corresponding to FIG. 4B, of a modified example of a controlling and diffusing optical area on the optical wheel of the optical wheel device according to the embodiment of the present invention, illustrating a second modified example.

Next, a second modified example of the embodiment will be described based on FIG. 6A. In the second modified example, an optical wheel 101B is provided in which a second wheel 120B is formed by use of a controlling and diffusing optical area 123B made up of a controlling and diffusing member into which a controlling section 231B and a diffusing section 232B are integrated in place of the controlling and diffusing optical area 123 of the embodiment described above. The number of surfaces on which light is incident (specifically, surfaces where the controlling section 231 and the diffusing section 232 are joined together) can be reduced by integrating the controlling section 231B, which is a cylindrical lens array including a plurality of cylindrical lenses CL whose radial cross section is recessed (formed into a recessed arc-like shape), and the diffusing section 232B, whereby the loss of incident light can be reduced.

Third Modified Example

Figure 6B:
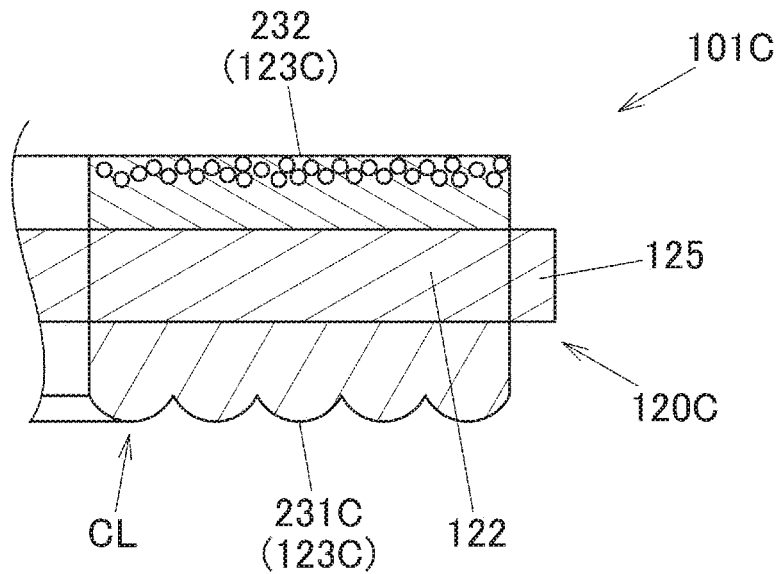
FIG. 6B is a schematic enlarged cross-sectional view of a main portion, corresponding to FIG. 4B, of a modified example of the controlling and diffusing optical area on the optical wheel of the optical wheel device according to the embodiment of the present invention, illustrating a third modified example.

Next, a third modified example will be described based on FIG. 6B. In the third modified example, an optical wheel 101C is provided. The optical wheel 101C includes a second wheel 120C having a controlling and diffusing optical area 123C including a controlling section 231C that is a cylindrical lens array including a plurality of cylindrical lenses CL whose radial cross section is convexly protuberant (formed into a protuberant arc-like shape) in place of the controlling section 231 of the controlling and diffusing optical area 123 of the embodiment described above.

Fourth Modified Example

Figure 6C:
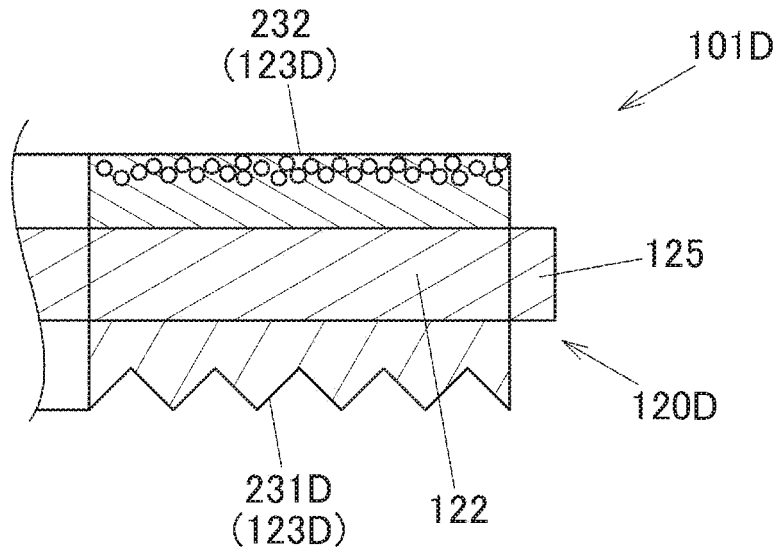
FIG. 6C is a schematic enlarged cross-sectional view of a main portion, corresponding to FIG. 4B, of a modified example of the controlling and diffusing optical area on the optical wheel of the optical wheel device according to the embodiment of the present invention, illustrating a fourth modified example.

Next, a fourth modified example of the embodiment will be described based on FIG. 6C. In the fourth embodiment, an optical wheel 101D is provided. The optical wheel 101D includes a second wheel 120D having a controlling and diffusing optical area 123D including a controlling section 231D whose radial cross section is made up of a series of prism-like shapes (formed into a serrated shape) in place of the controlling section 231 of the controlling and diffusing optical area 123 of the embodiment described above.

As illustrated in the embodiment and the second to fourth modified examples, in a plan view of the optical wheel 101 (as seen from the one side 100a or the other side 100b), the controlling sections 231, 231B to 231D can be formed into the plurality of arc-shaped cylindrical lenses CL whose radial cross section is recessed or protuberant, or the plurality of prism-shaped (serrated) lenses constituting the prism surface on which a number of prism-like shapes are formed.

In the embodiment and the second to fourth modified examples, the controlling sections 231, 231B to 231D are described as being made up of the plurality of cylindrical lenses CL whose radial cross section is recessed or protuberant, or the plurality of prism-shaped lenses, but the present invention is not limited to these configurations. In the controlling sections 231, 231B to 231D, the recessed or protuberant cross-sectional shapes of the cylindrical lenses CL, or the cross-sectional shapes of the plurality of prism-shaped lenses do not have to be aligned in the radial direction. Hence, the cylindrical lenses CL or the plurality of prism-shaped lenses only need to be disposed in such a manner that the degree at which the minor axis direction of the elliptic cross section of light in the first wavelength range emitted from the blue laser diode 71 (the first semiconductor light emitting device) spreads is greater than the degree at which the major axis direction of the elliptic cross section of light in the first wavelength range spreads. Consequently, the directions of the recessed shapes or the protuberant shapes of the cylindrical lenses CL, or the directions of the cross-sectional shapes of the plurality of prism-shaped lenses only need to be aligned with the major axis direction of the elliptic cross-sectional shape of the laser light S, and thus, the controlling sections 231B, 231C, 231D may be disposed in such a manner that the recessed cross sections or protuberant cross sections of the cylindrical lenses CL or the cross sections of the plurality of prism-shaped lenses are directed in the circumferential direction of the second wheels 120B, 120C, 120D.

Fifth Modified Example

Figure 7A:
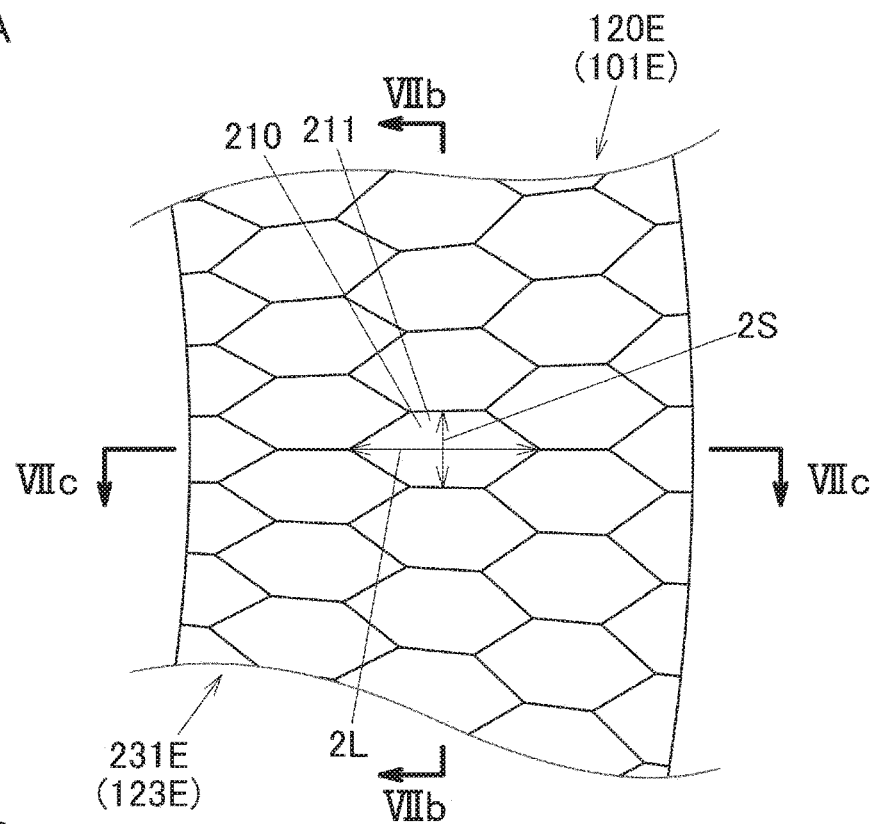
FIG. 7A is a diagram illustrating a fifth modified example of the controlling and diffusing optical area on the optical wheel of the optical wheel device according to the embodiment of the present invention, that is, a schematic enlarged plan view of a main portion thereof.
Figure 7B:
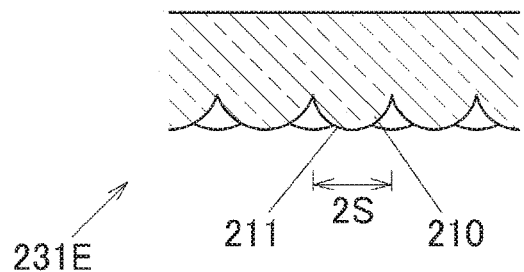
FIG. 7B is a diagram illustrating the fifth modified example of the controlling and diffusing optical area on the optical wheel of the optical wheel device according to the embodiment of the present invention, that is, a cross-sectional view taken along a line VIIb-VIIb in FIG. 7A.
Figure 7C:
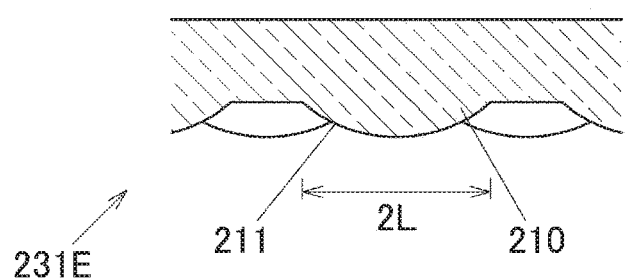
FIG. 7C is a diagram illustrating the fifth modified example of the controlling and diffusing optical area on the optical wheel of the optical wheel device according to the embodiment of the present invention, that is, a cross-sectional view taken along a line VIIc-VIIc in FIG. 7A.

Next, a fifth modified example of the embodiment will be described based on FIGS. 7A, 7B, and 7C. In the fifth modified example, in place of the controlling section 231 of the controlling and diffusing optical area 123 of the embodiment described above, a controlling section 231E is provided which includes a plurality of diffuse cells 210. As illustrated in FIG. 7A, the diffuse cell 210 is disposed with a lens surface 211 directed towards one side 100a. The lens surface 211 has a hexagonal shape in a plan view, and a first direction 2L (a major axis direction) and a second direction 2S (a minor axis direction) have different lengths. Thus, the diffuse cell 210 is disposed in such a manner that the first direction 2L constitutes a radial direction of a second optical wheel 120E (an optical wheel 101E). As illustrated in FIGS. 7B, 7C, the diffuse cell 210 is formed into an arc-like shape that protrudes towards the one side 100a, and a radius of curvature of the diffuse cell 210 is made to differ between in the first direction 2L and in the second direction 2S. Consequently, when excitation light is shined on to the controlling section 231E of a controlling and diffusing optical area 123E, laser light S of an elliptic cross section can be controlled in such a manner that an angle at which a minor axis direction of the laser light S spreads is expanded.

In the fifth modified example, while the hexagonal diffuse cell is disposed in such a manner that the first direction 2L (the major axis direction) thereof constitutes the radial direction of the second optical wheel 120E (the optical wheel 101E), the present invention is not limited to this configuration. The hexagonal diffuse cell 210 only needs to be disposed in such a manner that the degree at which the minor axis direction of the elliptic cross section of light in the first wavelength range emitted from the blue laser diode 71 (the first semiconductor light emitting device) spreads is greater than the degree at which the major axis direction of the elliptic cross section of light in the first wavelength range spreads. Consequently, the diffuse cell 210 only needs to be disposed in such a manner as to be aligned with the major axis direction of the elliptic cross section of the laser light S, and the diffuse cell 210 may be disposed in such a manner that the second direction 2S (the minor axis direction) of the diffuse cell 210 constitutes a radial direction of the second optical wheel 120E (the optical wheel 101E).

Thus, according to the embodiment and its modified examples, the optical wheels 101, 101B to 101E include the controlling and diffusing optical areas 123, 123B to 123E, respectively, and the controlling and diffusing optical areas 123, 123B to 123E include the luminescent material light emitting area 126 in which light in the blue wavelength range (excitation light) constituting light in the first wavelength range is incident thereon from the one side 100a and luminescent light excited by the light in the first wavelength range is emitted from the other side 100b, and the controlling sections 231, 231B to 231E on which light in the first wavelength range is incident from the one side 100a and whose diffusing characteristic relative to the light in the first wavelength range differs between in the radial direction and in the circumferential direction.

As a result, in using light emitted from the semiconductor light emitting device as excitation light and then, using the excitation light as light source light, the cross-sectional shape of the excitation light can be controlled, so that the excitation light can be formed into the light having substantially the same shape and range as those of luminescent light. Thus, the illuminance error or the chromatic error of projection light can be reduced.

Of the radial direction and the circumferential direction of the controlling sections 231, 231B to 231E, the direction in which the degree at which light in the first wavelength range spreads is greater substantially coincides with the minor axis direction of the elliptic cross-sectional shape of light in the first wavelength range. As a result, light of the elliptic cross section can be controlled into light of a substantially circular cross section.

The luminescent material light emitting area 126 and the controlling and diffusing optical areas 123, 123B to 123E are provided end to end in the circumferential direction. As a result, the optical wheel 101, 101B to 101E can be controlled based on the revolution control of the motor as the substantially circular disc-shaped optical wheel 101.

The controlling and diffusing optical area 123 includes the diffusing section 232 configured to emit the light in the first wavelength range that has passed through the controlling section 231 while diffusing it and includes the transmitting member 122 configured to transmit light between the controlling section 231 and the diffusing section 232. As a result, the controlling and diffusing optical area 123 can be formed with the controlling section 231 and the diffusing section 232 functioning as the separate members, whereby the optical wheel 101 can easily be assembled or fabricated.

The controlling and diffusing optical area 123B includes the diffusing section 232B configured to emit the light in the first wavelength range that has passed through the controlling section 231B to the other side 100b while diffusing it, and the controlling section 231B and the diffusing section 232B can be integrated into one unit. As a result, the number of surfaces through which transmitted light passes can be reduced, whereby the loss of light can be reduced.

The controlling sections 231, 231B to 231D are formed by the plurality of cylindrical lenses CL which are formed into the arc-like shape in the plan view and whose cross-sectional shape in the radial direction or in the circumferential direction of the optical wheels 101, 101B to 101D is recessed or protuberant, or the plurality of prism-shaped lenses. As a result, the spreading angle of laser light can be controlled by the simple configuration.

The controlling section 231E is formed into the arc-like shape and includes the plurality of diffuse cells 210. The diffuse cells 210 are formed in such a manner that the spreading angle differs between in the radial direction (for example, the first direction 2L) and in the circumferential direction (for example, the second direction 2S) of the controlling section 231E. That is, in the diffuse cell 210, the spreading angle differs between in the radial direction and in the circumferential direction of the controlling section 231E. As a result, since the controlling section 231E formed of the plurality of diffuse cells can be used, the diffusing characteristics both in the radial direction and the circumferential direction (the first direction 2L and the second direction 2S) can be controlled.

The luminescent material light emitting area 126 includes the first luminescent material light emitting area 126R configured to emit luminescent light in the red wavelength range, which constitutes the first luminescent light, by using light in the first wavelength range and the second luminescent material light emitting area 126G configured to emit luminescent light in the green wavelength range, which constitutes the second luminescent light whose wavelength differs from that of the first luminescent light by using light in the first wavelength range. As a result, bright luminescent light beams having the different wavelengths can be obtained.

The dichroic area 113 configured to reflect light in the first wavelength range and transmit luminescent light from the luminescent material light emitting area 126 is formed on the other side 100b of the luminescent material light emitting area 126. As a result, not only can a risk of light in the blue wavelength range, that is, light in the first wavelength range being mixed with luminescent light emitted from the optical wheel 101 be reduced, but also the excitation light that is not used in exciting the luminescent material can be reflected again to be used in exciting the luminescent material, whereby the efficiency of excitation light can be enhanced while obtaining the light source with the improved color purity.

The light source unit 60 including the optical wheel 101, the motor 103, the driving control unit for the motor 103, and the blue laser diode 71 as the first semiconductor light emitting device that is configured to emit light in the first wavelength range, or the light source unit 60A including the second semiconductor light emitting device configured to emit light in the second wavelength range and in which light in the second wavelength range is allowed to pass through the controlling and diffusing optical area 123 can provide the light source units 60, 60A that can reduce the illuminance error or the chromatic error and emit light beams in the red, green and blue wavelength ranges.

Then, the projectors 10, 10A can be provided which include the light source units 60, 60A, the display device 51 on to which light source light from the light source units 60, 60A is shined to form image light, the projection optical system 220 configured to project the image light emitted from the display device 51 on to a screen, and the projector control unit configured to control the display device 51 and the light source units 60, 60A and which can reduce the illuminance error or the chromatic error.

While the embodiment and its modified examples of the present invention have been described heretofore, the embodiments and its modified examples are presented as examples, and hence, there is no intention to limit the scope of the present invention by the embodiment and its modified examples. These novel embodiment and modified examples can be carried out in other various forms, and various omissions, replacements and modifications can be made to them without departing from the spirit and scope of the present invention. Those resulting embodiments and their modifications are included in the spirit and scope of the present invention and are also included in the scope of inventions claimed for patent under claims below and their equivalents.

What is claimed is:

1. An optical wheel comprising:
a luminescent material light emitting area on which light in a first wavelength range is incident from one side to thereby emit luminescent light excited by the light in the first wavelength range from another side; and
a controlling and diffusing optical area comprising a controlling section on which the light in the first wavelength range is incident from the one side and configured to cause a diffusing characteristic of the light in the first wavelength range to differ between in a radial direction and in a circumferential direction,
wherein of the radial direction and the circumferential direction of the controlling section, a direction in which a spreading angle of the light in the first wavelength range is greater substantially coincides with a minor axis direction of an elliptic cross-sectional shape of the light in the first wavelength range.

2. The optical wheel according to claim 1,
wherein the luminescent material light emitting area and the controlling and diffusing optical area are each formed into an arc-like shape and are provided end to end with each other.

3. The optical wheel according to claim 1,
wherein the controlling and diffusing optical area comprises a diffusing section configured to emit the light in the first wavelength range that has passed through the controlling section to the other side while diffusing the light in the first wavelength range.

4. The optical wheel according to claim 3, comprising:
a transmitting member configured to transmit light, the transmitting member being provided between the controlling section and the diffusing section.

5. The optical wheel according to claim 3, comprising:
a controlling and diffusing member into which the controlling section and the diffusing section are integrated.

6. The optical wheel according to claim 1,
wherein the controlling section is formed by a plurality of cylindrical lenses which are formed into an arc-like shape and whose cross-sectional shape in a radial direction or in a circumferential direction is recessed or protuberant.

7. The optical wheel according to claim 1,
wherein the controlling section is formed by a plurality of lenses which are formed into an arc-like shape and whose cross-sectional shape in a radial direction or in a circumferential direction has a prism-like shape.

8. The optical wheel according to claim 1,
wherein the controlling section is formed into an arc-like shape and comprises a plurality of diffuse cells, the diffuse cells each having a spreading angle that differs between in a radial direction and in a circumferential direction of the controlling section.

9. The optical wheel according to claim 1,
wherein the luminescent material light emitting area comprises a first luminescent material light emitting area configured to emit first luminescent light by use of the light in the first wavelength range, and a second luminescent material light emitting area configured to emit second luminescent light having a wavelength that differs from a wavelength of the first luminescent light by use of the light in the first wavelength range.

10. The optical wheel according to claim 1,
wherein a dichroic area is formed on the other side of the luminescent material light emitting area, the dichroic area being configured to reflect the light in the first wavelength range and transmit luminescent light from the luminescent material light emitting area.

11. A light source unit comprising:
the optical wheel according to claim 1;
a motor configured to drive to rotate the optical wheel;
a driving control unit for the motor; and
a first semiconductor light emitting device configured to emit the light in the first wavelength range.

12. The light source unit according to claim 11, comprising:
a second semiconductor light emitting device configured to emit light in a second wavelength range, the light in the second wavelength range being configured to pass through the controlling and diffusing optical area.

13. A projector comprising:

the light source unit according to claim 11;

a display device on to which light source light from the light source unit is shined to receive the light source light and reflect image light;

a projection optical system configured to project the image light reflected by the display device on to a screen; and a control unit configured to control the display device and the light source unit.

\* \* \* \* \*